(12) United States Patent
Zhang et al.

(10) Patent No.: US 10,725,479 B2
(45) Date of Patent: Jul. 28, 2020

(54) AERIAL VEHICLE LANDING METHOD, AERIAL VEHICLE, AND COMPUTER READABLE STORAGE MEDIUM

(71) Applicant: AUTEL ROBOTICS CO., LTD., Shenzhen, Guangdong (CN)

(72) Inventors: Ke Zhang, Guangdong (CN); Bo Zang, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 189 days.

(21) Appl. No.: 15/849,066

(22) Filed: Dec. 20, 2017

(65) Prior Publication Data
US 2019/0072983 A1   Mar. 7, 2019

Related U.S. Application Data

(63) Continuation of application No. PCT/CN2017/000758, filed on Sep. 6, 2017.

(51) Int. Cl.
*G05D 1/06* (2006.01)
*B64C 39/02* (2006.01)
(Continued)

(52) U.S. Cl.
CPC ......... *G05D 1/0684* (2013.01); *B64C 39/024* (2013.01); *G05D 1/0094* (2013.01);
(Continued)

(58) Field of Classification Search
CPC ...... G05D 1/0684; G05D 1/0094; G05D 1/12; B64C 39/024; B64C 2201/027;
(Continued)

(56) References Cited

U.S. PATENT DOCUMENTS 6,064,924 A * 5/2000 Fleischmann ........... G01S 7/411
701/16
9,056,676 B1 * 6/2015 Wang ........................ B64F 1/00
(Continued)

FOREIGN PATENT DOCUMENTS

CN       102722697 A     10/2012
CN       103218607 A      7/2013
(Continued)

OTHER PUBLICATIONS

International Search Report dated Jun. 7, 2018; PCT/CN2017/100758.
(Continued)

*Primary Examiner* — Peter D Nolan (57) ABSTRACT

The present invention relates to an aerial vehicle landing method, an aerial vehicle, and a computer readable storage medium. The present invention has no requirement on a motion form of a dynamic target and whether a measurement device is equipped, and does not require that a feature image of a target is obtained in advance either. Instead, motion information of a target is obtained by means of desirable tracking real-timeness of an on-board image device. Therefore, it is ensured that the aerial vehicle can reach a location near the target, and this process allows the dynamic target to have a complex motion form. Desirable tracking real-timeness allows an aerial vehicle to change a target at any flight time point, and continuous tracking and precise landing can be achieved.

42 Claims, 5 Drawing Sheets

(51) Int. Cl.
*G05D 1/00* (2006.01)
*G05D 1/12* (2006.01)

(52) U.S. Cl.
CPC .......... *G05D 1/12* (2013.01); *B64C 2201/027* (2013.01); *B64C 2201/108* (2013.01); *B64C 2201/205* (2013.01); *B64C 2201/206* (2013.01); *B64C 2201/208* (2013.01)

(58) Field of Classification Search
CPC ........ B64C 2201/108; B64C 2201/205; B64C 2201/206; B64C 2201/208; B64C 2201/18; B64C 27/08; B64C 2201/141; B64C 2201/024
See application file for complete search history.

(56) References Cited

U.S. PATENT DOCUMENTS

| | | | | |
|---|---|---|---|---|
| 9,302,783 | B2* | 4/2016 | Wang | B64F 1/00 |
| 9,457,915 | B2* | 10/2016 | Wang | B64F 1/00 |
| 9,568,919 | B2* | 2/2017 | Lim | G05D 1/0684 |
| 9,889,932 | B2* | 2/2018 | Sharma | B64C 39/024 |
| 9,939,819 | B2* | 4/2018 | Lim | G05D 1/0684 |
| 10,059,467 | B2* | 8/2018 | Wang | B60R 9/00 |
| 10,152,059 | B2* | 12/2018 | Banerjee | G06T 7/00 |
| 10,217,367 | B2* | 2/2019 | Chun | B64C 39/024 |
| 2006/0074557 | A1* | 4/2006 | Mulligan | G05D 1/0094 |
| | | | | 701/13 |
| 2011/0066307 | A1 | 3/2011 | Hiebl | |
| 2012/0277934 | A1* | 11/2012 | Ohtomo | G05D 1/0669 |
| | | | | 701/15 |
| 2015/0066253 | A1* | 3/2015 | Hayes | B64D 45/00 |
| | | | | 701/3 |
| 2015/0353206 | A1* | 12/2015 | Wang | B64F 1/00 |
| | | | | 244/114 R |
| 2016/0023762 | A1* | 1/2016 | Wang | B64F 1/00 |
| | | | | 701/3 |
| 2016/0196756 | A1* | 7/2016 | Prakash | B64C 39/024 |
| | | | | 701/3 |
| 2016/0257401 | A1* | 9/2016 | Buchmueller | B64C 39/024 |
| 2016/0274577 | A1* | 9/2016 | Heinonen | B64D 1/08 |
| 2016/0332748 | A1* | 11/2016 | Wang | B64F 1/00 |
| 2017/0045894 | A1* | 2/2017 | Canoy | G05D 1/0676 |
| 2017/0102713 | A1* | 4/2017 | Lim | G05D 1/0684 |
| 2017/0308100 | A1* | 10/2017 | Iskrev | G05D 1/10 |
| 2018/0057153 | A1* | 3/2018 | Rappl | B64C 25/56 |
| 2018/0101173 | A1* | 4/2018 | Banerjee | G06T 7/70 |
| 2018/0144643 | A1* | 5/2018 | Moravek | G08G 5/0021 |
| 2018/0165973 | A1* | 6/2018 | Chun | B64C 39/024 |
| 2018/0224868 | A1* | 8/2018 | Lim | G05D 1/0684 |
| 2018/0251234 | A1* | 9/2018 | Wang | B64F 1/00 |
| 2018/0364740 | A1* | 12/2018 | Collins | G05D 1/0684 |
| 2019/0138028 | A1* | 5/2019 | Coleman | G05D 1/0684 |
| 2019/0265705 | A1* | 8/2019 | Zhang | B64C 39/024 |

FOREIGN PATENT DOCUMENTS

| | | |
|---|---|---|
| CN | 106494632 A | 3/2017 |
| CN | 106527471 A | 3/2017 |
| CN | 206470615 U | 9/2017 |

OTHER PUBLICATIONS

Supplementary Partial European Search Report completed Oct. 2, 2019; EP17814288.

* cited by examiner

AERIAL VEHICLE LANDING METHOD, AERIAL VEHICLE, AND COMPUTER READABLE STORAGE MEDIUM

CROSS REFERENCE

This application is a continuation of International Application No. PCT/CN2017/100758, filed on Sep. 6, 2017, the disclosure of which is hereby incorporated by reference in its entirety.

TECHNICAL FIELD

The present application relates to the field of aerial vehicle technologies, and in particular, to an aerial vehicle landing method, an aerial vehicle, and a computer readable storage medium.

BACKGROUND

As vision algorithms are developed and applied to unmanned aerial vehicle (UAV) platforms, intelligent tracking has achieved desirable tracking effects. How to implement an entire unmanned process from tracking to landing is an important direction for making unmanned aerial vehicles more intelligent. In an existing unmanned aerial vehicle technology, a function of returning home by pressing one key can enable an aerial vehicle to autonomously fly to a specified place according to a one-off instruction of a user, and flight and landing processes no longer require involvement of a user. However, this technology is limited to returning to and landing on a fixed location.

Currently, an unmanned aerial vehicle in the prior art is already capable of precisely landing on a special returning location that moves continuously such as a car or a ship. However, this technology requires that an external measurement apparatus (for example, a GPS) obtains motion information of a moving target. Besides, a method of fusion image feature matching so that obtaining a precise landing location requires inputting image information of a target in advance. If a target is not equipped with a measurement apparatus or a returning target changes in a flight process, this method becomes invalid.

SUMMARY

Based on this, to the above-mentioned problem in the prior art, it is necessary to provide an aerial vehicle landing method, an aerial vehicle, and a computer readable storage medium that have no requirement on a motion form of a target, a mode change, and whether a measurement device is equipped, and do not require that a feature image of a target location is obtained in advance either.

An aerial vehicle landing method includes:
determining, by an aerial vehicle, a dynamic target, where the dynamic target is a target in motion;
following, by the aerial vehicle, the dynamic target; and
landing, by the aerial vehicle, on the dynamic target or near the dynamic target, when the aerial vehicle approaches the dynamic target.

In an embodiment of the present invention, before the determining, by an aerial vehicle, a dynamic target, the method further includes:
receiving, by the aerial vehicle, information sent by a controller, where the information is used for indicating the dynamic target selected by a user.

In an embodiment of the present invention, before the receiving, by the aerial vehicle, information sent by a controller, the method further includes:
sending, by the aerial vehicle, an instruction for reselecting a target to the controller.

In an embodiment of the present invention, before the determining, by an aerial vehicle, a dynamic target, the method further includes:
receiving, by the aerial vehicle, a landing instruction sent by the dynamic target, where the landing instruction is used to instruct the aerial vehicle to land on the dynamic target or near the dynamic target.

In an embodiment of the present invention, the landing, by the aerial vehicle, on the dynamic target or near the dynamic target, when the aerial vehicle approaches the dynamic target, includes:
landing, by the aerial vehicle, on the dynamic target, when the aerial vehicle flies to a location above the dynamic target.

In an embodiment of the present invention, the landing, by the aerial vehicle, on the dynamic target includes:
landing, by the aerial vehicle, on the dynamic target, when a speed of the aerial vehicle relative to the dynamic target is less than a preset threshold.

In an embodiment of the present invention, the landing, by the aerial vehicle, on the dynamic target includes:
landing, by the aerial vehicle, on the dynamic target, when the aerial vehicle is relatively static to the dynamic target.

In an embodiment of the present invention, the method further includes:
maintaining, by the aerial vehicle, a flight height of the aerial vehicle unchanged until the aerial vehicle flies to a location right above the dynamic target; and
adjusting, by the aerial vehicle, a flight speed of the aerial vehicle, so that the aerial vehicle keeps relatively static to the dynamic target.

In an embodiment of the present invention, that the aerial vehicle approaches the dynamic target refers to that the aerial vehicle is located in a location right above the dynamic target.

In an embodiment of the present invention, that the aerial vehicle approaches the dynamic target refers to that a distance between the aerial vehicle and the dynamic target is less than a preset threshold.

In an embodiment of the present invention, the landing, by the aerial vehicle, near the dynamic target includes:
landing, by the aerial vehicle, on the ground near the dynamic target.

In an embodiment of the present invention, the landing, by the aerial vehicle, near the dynamic target includes:
landing, by the aerial vehicle, on water near the dynamic target.

In an embodiment of the present invention, the landing, by the aerial vehicle, on the dynamic target or near the dynamic target includes:
determining a type of the dynamic target; and
if the dynamic target is a type of dynamic target that is unsuitable for landing, landing in a location whose distance from the dynamic target is less than a preset distance.

In an embodiment of the present invention, the dynamic target that is unsuitable for landing includes a person or other animals.

In an embodiment of the present invention, after the determining, by an aerial vehicle, a dynamic target, the method further includes:
determining whether energy of the aerial vehicle can support the aerial vehicle to reach a location near the dynamic target; and if a determining result is no, sending prompt information to the controller, where the prompt information is used to prompt the user to reselect a dynamic target, and/or prompt the user that the energy of the aerial vehicle is insufficient.

In an embodiment of the present invention, the determining whether energy of the aerial vehicle can support the aerial vehicle to reach a location near the dynamic target includes:

predicting, by the aerial vehicle according to a current movement status of the dynamic target, a flight distance that needs to be flown;

determining, by the aerial vehicle, energy that is consumed to fly a unit distance at a maximum flight speed of the aerial vehicle;

calculating, by the aerial vehicle according to the predicted flight distance and the energy that is consumed to fly the unit distance, energy that is needed for the aerial vehicle to reach a location near the dynamic target; and determining whether the needed energy is less than remaining energy of the aerial vehicle; and if not, sending prompt information to the controller.

In an embodiment of the present invention, the determining whether the needed energy is less than remaining energy of the aerial vehicle includes:

determining whether $$\lambda = \frac{E_{need}}{E_{left} \times \eta}$$

is less than 1; and if not, sending the prompt information to the controller, where $E_{left}$ is the remaining energy of the aerial vehicle, and $E_{need}$ is the needed energy of the aerial vehicle;

$E_{need}=LE^*$, L is the flight distance predicted by the aerial vehicle according to the current movement status of the dynamic target, $$L \approx d_a + \left(v_a + \frac{v_a}{v_r} + \frac{v_a^2}{v_r^2}\right)\frac{d_a}{v_r},$$

$d_a$ indicates a current absolute distance between the aerial vehicle and the dynamic target, $v_a$ is a movement speed of the dynamic target, and $v_r$ is the maximum flight speed of the aerial vehicle;

$E^*$ is the energy that is consumed to fly the unit distance at the maximum flight speed by the aerial vehicle; and $\eta$ indicates an energy output ratio, that is, a ratio of a maximum actual output energy to a battery capacity.

In an embodiment of the present invention, the method further includes:

sending, by the aerial vehicle, information prompting the user that the energy of the aerial vehicle is insufficient to the controller, in a process in which the aerial vehicle tracks the dynamic target, when $0.8<\lambda<1$.

In an embodiment of the present invention, in the process of tracking the dynamic target by the aerial vehicle, the method further includes:

maintaining, by the aerial vehicle, the dynamic target to be located in a central area of an image shot by the aerial vehicle.

In an embodiment of the present invention, in the process of tracking the dynamic target by the aerial vehicle, the method further includes:

maintaining, by the aerial vehicle, the center of the dynamic target to fall within a range whose distance to the vision angle center of the aerial vehicle is less than a preset threshold.

In an embodiment of the present invention, the maintaining, by the aerial vehicle, the center of the dynamic target to fall within a range whose distance to the vision angle center of the aerial vehicle is less than a preset threshold includes:

maintaining, by the aerial vehicle, the vision angle center of the aerial vehicle to be overlapped with the center of the dynamic target.

In an embodiment of the present invention, the maintaining, by the aerial vehicle, the vision angle center of the aerial vehicle to be overlapped with the center of the dynamic target includes:

adjusting, by the aerial vehicle, at least one of the following parameters, to maintain the vision angle center of the aerial vehicle to be overlapped with the center of the dynamic target:

the flight speed of the aerial vehicle, the flight height of the aerial vehicle and an angle of a camera.

In an embodiment of the present invention, the method further includes:

determining, by the aerial vehicle, whether a ratio of a vision angle $\alpha$ for capturing the dynamic target to a maximum vision angle $\alpha^*$ of the camera exceeds a secure vision angle ratio $\varepsilon$; and if a result is yes, adjusting, by the aerial vehicle, the flight height of the aerial vehicle, where $\varepsilon<1$.

An aerial vehicle includes:

a housing;

an aerial vehicle arm connected to the housing; and a power apparatus disposed on the aerial vehicle arm and a processor disposed in the housing, where the processor is configured to:

determine a dynamic target, where the dynamic target is a target in motion;

control the unmanned aerial vehicle to follow the dynamic target; and control the aerial vehicle to land on the dynamic target or near the dynamic target, when the aerial vehicle approaches the dynamic target.

In an embodiment of the present invention, the aerial vehicle further includes:

a transceiver, configured to receive information sent by a controller, where the information is used for indicating the dynamic target selected by a user.

In an embodiment of the present invention, the transceiver is further configured to send an instruction for reselecting a target to the controller.

In an embodiment of the present invention, the transceiver is further configured to receive a landing instruction sent by the dynamic target, where the landing instruction is used to instruct the aerial vehicle to land on the dynamic target or near the dynamic target.

In an embodiment of the present invention, the processor is specifically configured to control the aerial vehicle to land on the dynamic target, when the aerial vehicle flies to a location above the dynamic target.

In an embodiment of the present invention, the processor is configured to: control the aerial vehicle to land on the dynamic target, when a speed of the aerial vehicle relative to the dynamic target is less than a preset threshold.

In an embodiment of the present invention, the processor is specifically configured to: when the aerial vehicle is still relative to the dynamic target, control the aerial vehicle to land on the dynamic target.

In an embodiment of the present invention, the processor is further configured to: control a flight height of the aerial vehicle to maintain unchanged until the aerial vehicle flies to a location right above the dynamic target; and adjust a flight speed of the aerial vehicle, so that the aerial vehicle keeps relatively static to the dynamic target.

In an embodiment of the present invention, that the aerial vehicle approaches the dynamic target refers to that the aerial vehicle is located in a location right above the dynamic target.

In an embodiment of the present invention, that the aerial vehicle approaches the dynamic target refers to that a distance between the aerial vehicle and the dynamic target is less than a preset threshold.

In an embodiment of the present invention, the processor is specifically configured to control the aerial vehicle to land on the ground near the dynamic target.

In an embodiment of the present invention, the processor is specifically configured to control the aerial vehicle to land on water near the dynamic target.

In an embodiment of the present invention, the processor is specifically configured to:

determine a type of the dynamic target; and if the dynamic target is a type of dynamic target that is unsuitable for landing, control the aerial vehicle to land in a location whose distance from the dynamic target is less than a preset distance.

In an embodiment of the present invention, the dynamic target that is unsuitable for landing includes a person or other animals.

In an embodiment of the present invention, the processor is further configured to:

determine whether energy of the aerial vehicle can support the aerial vehicle to reach a location near the dynamic target; and if a determining result is no, send prompt information to the controller, where the prompt information is used to prompt the user to reselect a dynamic target, and/or prompt the user that the energy of the aerial vehicle is insufficient.

In an embodiment of the present invention, the processor is specifically configured to:

predict, according to a current movement status of the dynamic target, a flight distance that needs to be flown;

determine energy that is consumed to fly a unit distance at a maximum flight speed of the aerial vehicle;

calculate, according to the predicted flight distance and the energy that is consumed to fly the unit distance, energy that is needed for the aerial vehicle to reach a location near the dynamic target; and determine whether the needed energy is less than remaining energy of the aerial vehicle; and if not, send prompt information to the controller by using the transceiver of the aerial vehicle.

In an embodiment of the present invention, the processor is specifically configured to:

determine whether $$\lambda = \frac{E_{need}}{E_{left} \times \eta}$$

is less than 1; and if not, sending the prompt information to the controller by using the transceiver, where $E_{left}$ is the remaining energy of the aerial vehicle, and $E_{need}$ is the needed energy of the aerial vehicle;

$E_{need}$=LE*, L is the flight distance predicted by the aerial vehicle according to the current movement status of the dynamic target, $$L \approx d_a + \left(v_a + \frac{v_a}{v_r} + \frac{v_a^2}{v_r^2}\right)\frac{d_a}{v_r},$$

$d_a$ indicates a current absolute distance between the aerial vehicle and the dynamic target, $v_a$ is a movement speed of the dynamic target, and $v_r$ is the maximum flight speed of the aerial vehicle;

E* is the energy that is consumed to fly the unit distance at the maximum flight speed by the aerial vehicle; and $\eta$ indicates an energy output ratio, that is, a ratio of a maximum actual output energy to a battery capacity.

In an embodiment of the present invention, the transceiver sends information prompting the user that the energy of the aerial vehicle is insufficient to the controller, in a process in which the aerial vehicle tracks the dynamic target, when $0.8 < \lambda < 1$.

In an embodiment of the present invention, in the process of tracking the dynamic target by the aerial vehicle, the processor is further configured to control the aerial vehicle so that the dynamic target is located in a central area of an image shot by the aerial vehicle.

In an embodiment of the present invention, in the process of tracking the dynamic target by the aerial vehicle, the processor is further configured to control the aerial vehicle so that the center of the dynamic target falls within a range whose distance to the vision angle center of the aerial vehicle is less than a preset threshold.

In an embodiment of the present invention, the processor is specifically configured to control the vision angle center of the aerial vehicle to be overlapped with the center of the dynamic target.

In an embodiment of the present invention, the processor is specifically configured to adjust at least one of the following parameters to control the vision angle center of the aerial vehicle to be overlapped with the center of the dynamic target:

the flight speed and the flight height of the aerial vehicle and an angle of a camera.

In an embodiment of the present invention, the processor is further configured to:

determine whether a ratio of a vision angle $\alpha$ for capturing the dynamic target to a maximum vision angle $\alpha^*$ of the camera exceeds a secure vision angle ratio $\epsilon$; and if a result is yes, adjust the flight height of the aerial vehicle, where $\epsilon < 1$.

An aerial vehicle includes:

a determining module, configured to determine a dynamic target, where the dynamic target is a target in motion;

a following module, configured to follow the dynamic target; and a landing module, configured to: control the aerial vehicle to land on the dynamic target or near the dynamic target, when the aerial vehicle approaches the dynamic target.

In an embodiment of the present invention, the aerial vehicle further includes a receiving module, and the receiving module is configured to receive information sent by the controller, where the information is used for indicating the dynamic target selected by a user.

In an embodiment of the present invention, the aerial vehicle further includes a sending module, and the sending module is configured to send an instruction for reselecting a target to the controller.

In an embodiment of the present invention, the aerial vehicle further includes a receiving module, and the receiving module is configured to receive a landing instruction sent by the dynamic target, where the landing instruction is used to instruct the aerial vehicle to land on the dynamic target or near the dynamic target.

In an embodiment of the present invention, the landing module is specifically configured to control the aerial vehicle to land on the dynamic target, when the aerial vehicle flies to a location above the dynamic target.

In an embodiment of the present invention, the landing module is specifically configured to: control the aerial vehicle to land on the dynamic target, when a speed of the aerial vehicle relative to the dynamic target is less than a preset threshold.

In an embodiment of the present invention, the landing module is specifically configured to: when the aerial vehicle is still relative to the dynamic target, control the aerial vehicle to land on the dynamic target.

In an embodiment of the present invention, the following module is further configured to: control a flight height of the aerial vehicle to maintain unchanged until the aerial vehicle flies to a location right above the dynamic target; and adjust a flight speed of the aerial vehicle, so that the aerial vehicle keeps relatively static to the dynamic target.

In an embodiment of the present invention, that the aerial vehicle approaches the dynamic target refers to that the aerial vehicle is located in a location right above the dynamic target.

In an embodiment of the present invention, that the aerial vehicle approaches the dynamic target refers to that a distance between the aerial vehicle and the dynamic target is less than a preset threshold.

In an embodiment of the present invention, the landing module is specifically configured to control the aerial vehicle to land on the ground near the dynamic target.

In an embodiment of the present invention, the landing module is specifically configured to control the aerial vehicle to land on water near the dynamic target.

In an embodiment of the present invention, the aerial vehicle further includes a target type determining module, and the target type determining module is configured to determine a type of the dynamic target; and when the target type determining module determines that the dynamic target is a type of dynamic target that is unsuitable for landing by the aerial vehicle, the landing module controls the aerial vehicle to land in a location whose distance from the dynamic target is less than a preset distance.

In an embodiment of the present invention, the target that is unsuitable for landing includes a person or other animals.

In an embodiment of the present invention, the aerial vehicle further includes an energy estimation module, and the energy estimation module is configured to determine whether energy of the aerial vehicle can support the aerial vehicle to reach a location near the dynamic target; and if a determining result of the energy estimation module is no, the sending module of the aerial vehicle sends prompt information to the controller, where the prompt information is used to prompt the user to reselect a dynamic target, and/or prompt the user that the energy of the aerial vehicle is insufficient.

In an embodiment of the present invention, the energy estimation module includes:

a distance calculation module, configured to predict, according to a current movement status of the dynamic target, a flight distance that needs to be flown; and an energy calculation and determining module, configured to:

calculate energy that is consumed to fly a unit distance at a maximum flight speed of the aerial vehicle by the aerial vehicle; and calculate, according to the predicted flight distance and the energy that is consumed to fly the unit distance, energy that is needed for the aerial vehicle to reach a location near the dynamic target; and determine whether the needed energy is less than remaining energy of the aerial vehicle; and if not, send prompt information to the controller by using the sending module of the aerial vehicle.

In an embodiment of the present invention, the energy calculation and determining module is configured to: determine whether $$\lambda = \frac{E_{need}}{E_{left} \times \eta}$$

is less than 1; and if not, send the prompt information to the controller by using the sending module, where $E_{left}$ is the remaining energy of the aerial vehicle, and $E_{need}$ is the needed energy of the aerial vehicle;

$E_{need}$=LE*, L is the flight distance predicted by the aerial vehicle according to the current movement status of the dynamic target, $$L \approx d_a + \left(v_a + \frac{v_a}{v_r} + \frac{v_a^2}{v_r^2}\right)\frac{d_a}{v_r},$$

$d_a$ indicates a current absolute distance between the aerial vehicle and the dynamic target, $v_a$ is a movement speed of the dynamic target, and $v_r$ is the maximum flight speed of the aerial vehicle;

E* is the energy that is consumed to fly the unit distance at the maximum flight speed by the aerial vehicle; and η indicates an energy output ratio, that is, a ratio of a maximum actual output energy to a battery capacity.

In an embodiment of the present invention, when the energy calculation and determining module determines that 0.8<λ<1, the sending module sends information prompting the user that the energy of the aerial vehicle is insufficient to the controller.

In an embodiment of the present invention, the following module is specifically configured to control the aerial vehicle to maintain the dynamic target to be located in a central area of an image shot by the aerial vehicle.

In an embodiment of the present invention, the following module is specifically configured to control the aerial vehicle to maintain the center of the dynamic target to fall within a range whose distance to the vision angle center of the aerial vehicle is less than a preset threshold.

In an embodiment of the present invention, the following module is specifically configured to control the vision angle center of the aerial vehicle to be overlapped with the center of the dynamic target.

In an embodiment of the present invention, the following module adjusts at least one of the following parameters to control the aerial vehicle so that the vision angle center of the aerial vehicle is overlapped with the center of the dynamic target:

the flight speed and the flight height of the aerial vehicle and an angle of a camera.

In an embodiment of the present invention, the aerial vehicle further includes a secure vision angle ratio calculation module, and the secure vision angle ratio calculation module is configured to: calculate a ratio of a vision angle α for capturing the dynamic target to a maximum vision angle α* of the camera; and when the ratio exceeds a secure vision angle ratio ε, adjust the flight height of the aerial vehicle, where ε<1.

An aerial vehicle includes a memory and a processor, where the memory stores a computer program, and when the computer program is executed by the processor, the processor is enabled to execute the foregoing aerial vehicle tracking method.

A computer readable storage medium stores a computer program, where when the computer program is executed by a processor, the processor is enabled to execute the foregoing aerial vehicle tracking method.

The present invention has no requirement on a motion form of a dynamic target and whether a measurement device is equipped, and does not require that a feature image of a target is obtained in advance either. Instead, motion information of a target is obtained by means of desirable tracking real-timeness of an on-board image device. Therefore, it is ensured that the aerial vehicle can reach a location near the target, and this process allows the dynamic target to have a complex motion form. Desirable tracking real-timeness allows an aerial vehicle to change a target at any flight time point, and continuous tracking and precise landing can be achieved.

DETAILED DESCRIPTION

To make the objectives, technical solutions, and advantages of the present invention more comprehensible, the present invention is described in further detail below with reference to accompanying drawings and embodiments. It should be understood that, the specific embodiments described herein are merely used to explain the present invention, but not intended to limit the present invention.

The present invention provides a method for controlling an aerial vehicle to land on a dynamic target or near a dynamic target, and an aerial vehicle that can land on a dynamic target or near a dynamic target. By controlling the aerial vehicle, the aerial vehicle can automatically track a specified dynamic target and the aerial vehicle can automatically land on the dynamic target or near the dynamic target.

Figure 1:
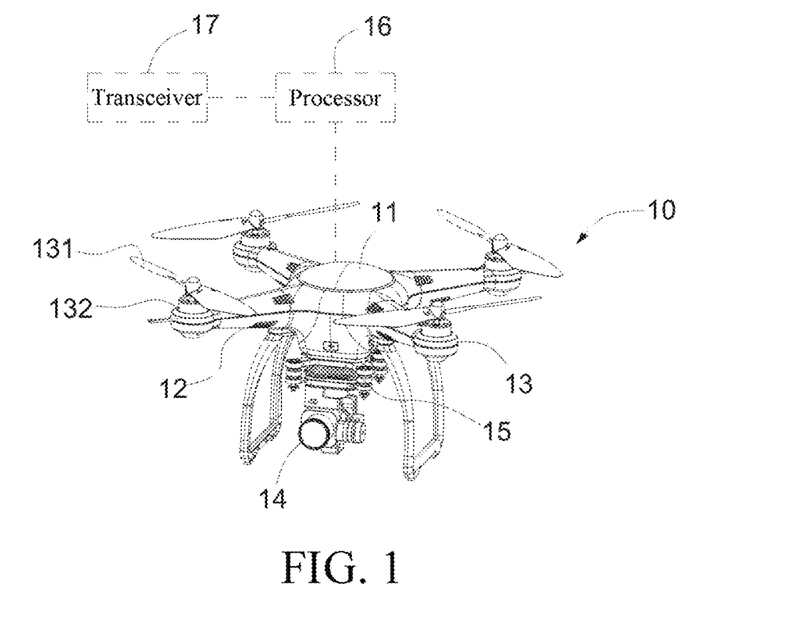
FIG. 1 is a schematic structural diagram of an aerial vehicle according to an embodiment of the present invention.

As shown in FIG. 1, an aerial vehicle 10 includes a housing 11, an aerial vehicle arm 12 connected to the housing 11, a power apparatus 13 disposed on an end of the aerial vehicle arm 12, a gimbal 15 connected to the housing 11, an image device 14 connected to the gimbal 15, and a processor 16 and a transceiver 17 that are disposed in the housing 11.

In this embodiment, there are four aerial vehicle arms 12, that is, the aerial vehicle is a quad-rotor aerial vehicle. In another possible embodiment, there may be three, six, eight, or ten aerial vehicle arms 12 or the like. The aerial vehicle 10 may also be another movable object such as a manned aerial vehicle, a model airplane, an unmanned airship, a fixed-wing unmanned aerial vehicle, or an unmanned hot air balloon.

The power apparatus 13 includes a rotor 132 disposed on an end of the aerial vehicle arm 12 and a propeller 131 connected to a rotation shaft of the rotor 132. The rotation shaft of the rotor 132 rotates to drive the propeller 131 to rotate to provide a lift three for the aerial vehicle 10.

The gimbal 15 is configured to reduce or eliminate vibration transmitted by the power apparatus 13 to the image device 14, to ensure that the image device 14 can shoot stably clear images or videos.

The image device 14 may be a similar device such as a binocular camera, a monocular camera, an infrared image device, an ultraviolet image device, or a camcorder. The image device 14 may be directly equipped on the aerial vehicle 10, or may be equipped on the aerial vehicle 10 by using the gimbal 15 described in this embodiment. The gimbal 15 allows the image device 14 to rotate around at least one shaft relative to the aerial vehicle 10.

Figure 2:
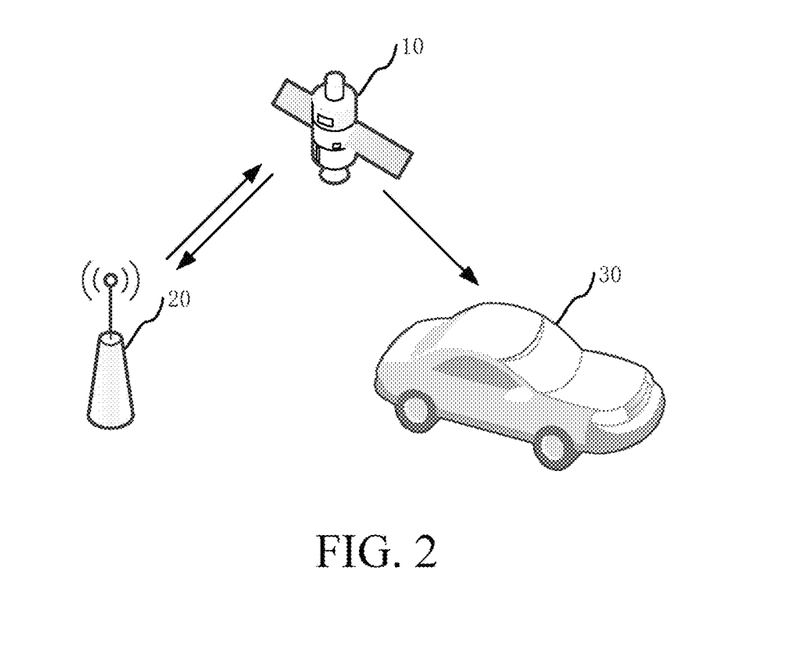
FIG. 2 is an application environment diagram of the aerial vehicle shown in FIG. 1 according to the present invention.

FIG. 2 is an application scenario diagram of the aerial vehicle 10 according to this embodiment. The controller 20 may send a control instruction to the aerial vehicle 10 to control the aerial vehicle 10. The aerial vehicle 10 may receive, by using the transceiver 17 disposed in the housing 11, the control instruction sent by the controller 20. The processor 16 controls the aerial vehicle 10 to follow the dynamic target 30 and land on the dynamic target 30 or near the dynamic target 30 by using a vision system equipped on the aerial vehicle 10 such as a camera.

The controller 20 may be specifically at least one of a remote controller, a signal transmission tower, a satellite and intelligent terminal, or the like.

The dynamic target 30 is a target in motion, and may be specifically at least one of a moving ship, a moving car, a moving train, a moving airship, a moving hot air balloon, a moving person, a moving animal, or the like.

In an embodiment of the present invention, the transceiver 17 may be a wireless fidelity (WiFi) module, a Long Term Evolution (LTE) module, a Bluetooth module, or the like disposed in the aerial vehicle 10.

The processor 16 may include multiple functional units, for example, a flight control unit configured to control a flight posture of the aerial vehicle, a target identification unit configured to identify a target, a tracking unit configured to track a specified target, a navigation unit (for example, a Global Positioning System (GPS) or Beidou) configured to navigate the aerial vehicle, and a data processing unit configured to process environment information obtained by a related on-board device (for example, the image device 14).

The aerial vehicle 10 sends an image or a video captured by the image device 14 to the controller 20 by using the transceiver 17. The controller 20 receives the image or the video transmitted by the aerial vehicle 10 and displays the image or the video to a user by using a display apparatus (for example, a display). By means of clicking, drawing a box, a speech, or another optional manner, the user selects a dynamic target that needs to be tracked. The controller 20 sends, to the aerial vehicle 10, information used for indicating the dynamic target already selected by the user. The aerial vehicle 10 receives, by using the transceiver 17 (for example, a WiFi module), the information used for indicating the dynamic target already selected by the user, and determines the dynamic target 30.

In another possible embodiment, alternatively, the dynamic target may send a tracking and landing instruction to the aerial vehicle. The aerial vehicle receives the tracking and landing instruction by using the transceiver, and tracks the dynamic target and lands on the dynamic target or near the dynamic target according to the tracking and landing instruction.

After the aerial vehicle 10 determines the dynamic target 30 that needs to be tracked and landed on, the processor 16 further determines whether the energy of the aerial vehicle 10 can support the aerial vehicle 10 to fly to a location near the dynamic target 30. The energy of the aerial vehicle 10 is a quantity of electricity or a quantity of fuel that supports the aerial vehicle 10 to complete a series of operations such as a flight task, a tracking task, and a landing action. In an embodiment of the present invention, the processor 16 may determine, according to the following steps, whether the energy of the aerial vehicle 10 can support the aerial vehicle to fly to a location near the dynamic target 30:

S1: Predict, according to a current movement status of the dynamic target 30, a flight distance that needs to be flown.

Figure 3:
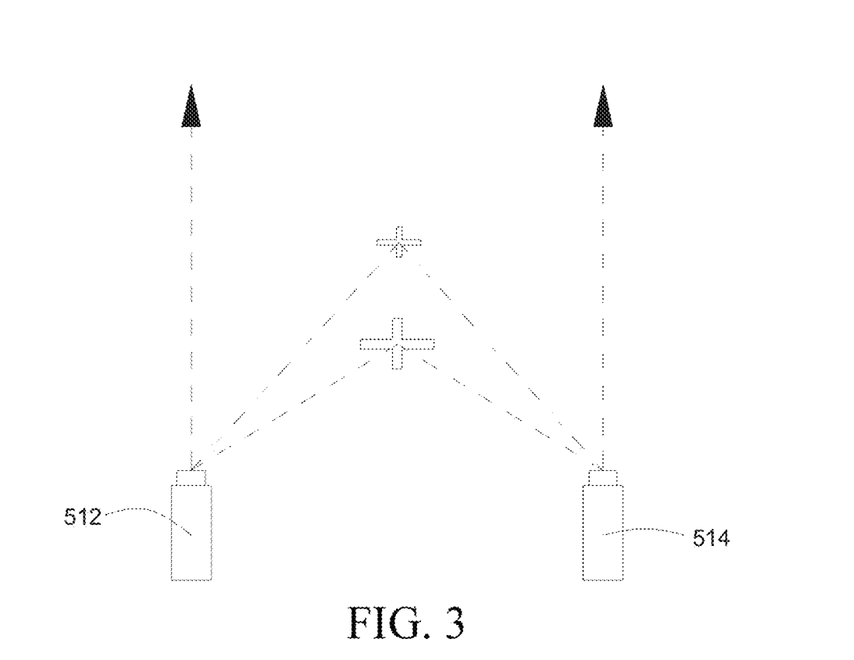
FIG. 3 is a schematic diagram of calculating a flight distance by using a binocular camera by the aerial vehicle shown in FIG. 1.

As shown in FIG. 3, the aerial vehicle 10 may obtain image information (for example, an image relationship of the dynamic target in continuous two frame images captured by the image device) of a target by using the image device (for example, binocular cameras 512 and 514) that can measure a distance, to solve the central position of the dynamic target 30. In a process of capturing the dynamic target 30, motion information of the aerial vehicle 10 is obtained by using an on-board sensor, and image transmission is performed according to a particular frame rate. In this way, movement speed information of the dynamic target 30 can be calculated by using a location difference of the dynamic target 30 between two continuous frames, to calculate the distance that needs to be flown.

Figure 4:
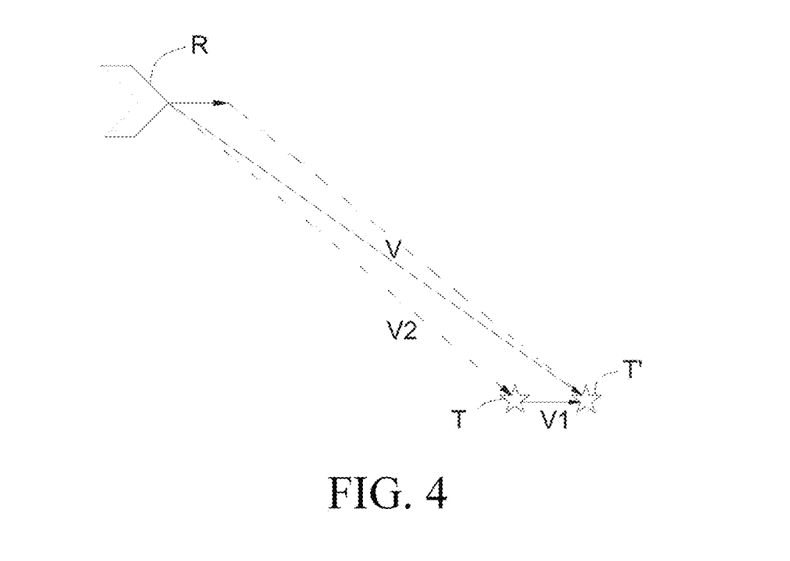
FIG. 4 is a schematic diagram of calculating a flight distance by using a parallelogram law by the aerial vehicle shown in FIG. 1.

Referring to FIG. 4, R indicates a current location of the aerial vehicle 10, T indicates a current location of the dynamic target 30, T' indicates a location of the dynamic target 30 at a next moment, V1 is a speed of the dynamic target 30 relative to the aerial vehicle 10 for projection on a horizontal plane, V2 is a speed at which the aerial vehicle 10 directly flies to the dynamic target 30, and a resultant speed V can be solved by using a parallelogram law, to calculate the distance that needs to be flown.

S2: Calculate, according to the calculated flight distance and energy that is consumed to fly a unit distance, energy that is needed for the aerial vehicle 10 to reach a location near the dynamic target 30.

S3: Determine whether the needed energy is less than remaining energy of the aerial vehicle 10; and if not, send prompt information to the controller 20 by using the transceiver 17 of the aerial vehicle 10. The prompt information is used to prompt the user to reselect a dynamic target, or prompt the user that the energy of the aerial vehicle 10 is insufficient, or prompt the user to reselect a dynamic target while prompting the user that the energy of the aerial vehicle 10 is insufficient.

By determining whether the aerial vehicle 10 has sufficient energy to fly to a location near the dynamic target 30, problems such as airplane collapse of the aerial vehicle 10 that is caused by insufficient energy can be avoided.

In view of this, the present invention provides an energy threshold factor $\lambda$ used to represent a relationship between the needed energy and the remaining energy. The processor 16 determines whether $\lambda$ is less than 1 to determine whether the aerial vehicle has sufficient energy to fly to a location near the dynamic target. In this embodiment, $$\lambda = \frac{E_{need}}{E_{left} \times \eta}.$$

$E_{left}$ is the remaining energy of the aerial vehicle 10, and $E_{need}$ is the needed energy of the aerial vehicle 10.

In this embodiment, $E_{need}$=LE*, L is the flight distance predicted by the aerial vehicle 10 according to the current movement status of the dynamic target 30, $$L \approx d_a + \left(v_a + \frac{v_a}{v_r} + \frac{v_a^2}{v_r^2}\right)\frac{d_a}{v_r},$$

$d_a$ indicates a current absolute distance between the aerial vehicle 10 and the dynamic target 30, $v_a$ is a movement speed of the dynamic target 30, and $v_r$ is the maximum flight speed of the aerial vehicle 10.

E* is the energy that is consumed to fly the unit distance at the maximum flight speed by the aerial vehicle 10; and $\eta$ indicates an energy output ratio, that is, a ratio of a maximum actual battery output energy to a battery capacity.

When $\lambda > 1$, it indicates that the aerial vehicle 10 has no sufficient energy to fly to a location near the dynamic target 30. In this case, the processor 16 in the aerial vehicle 10 sends, to the controller 20 by using the transceiver 17, the prompt information that prompts the user to reselect a dynamic target, or the prompt information that prompts the user that the energy of the aerial vehicle 10 is insufficient, or the prompt information that prompts the user to reselect a dynamic target while prompting the user that the energy of the aerial vehicle 10 is insufficient.

When $\lambda < 1$, it indicates that the aerial vehicle 10 has sufficient energy to fly to a location near the dynamic target 30. In this case, the processor 16 controls the aerial vehicle 10 to follow the dynamic target 30.

In addition, when the processor 16 determines that $0.8 < \lambda < 1$, it indicates that energy that the aerial vehicle 10 needs to consume to fly to a location near the dynamic target 30 is close to or reaches a critical value of the remaining energy. In this case, the aerial vehicle 10 still follows the dynamic target 30, but continuously sends a prompt or an alert indicating that the aerial vehicle 10 has insufficient energy to the controller 20.

Figure 5:
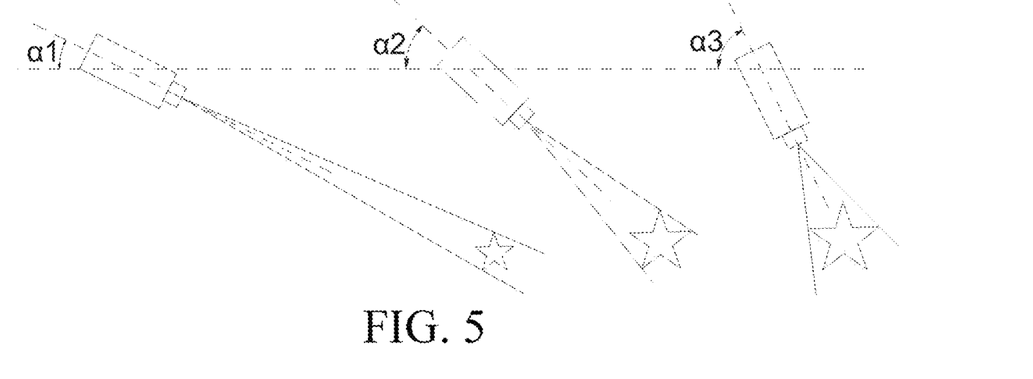
FIG. 5 is a schematic diagram in which the center of a dynamic target is located in a central area of an image captured by the aerial vehicle shown in FIG. 1 according to the present invention.

As shown in FIG. 5, when the aerial vehicle 10 tracks the dynamic target 30, the processor 10 further needs to control the aerial vehicle 10 so that the dynamic target 30 is located in a central area of the image captured by the aerial vehicle 10. The dynamic target 30 is always maintained to be in the central area of the image captured by the aerial vehicle 10, so that the aerial vehicle 10 can better track the dynamic target 30.

In an embodiment of the present invention, the center of the dynamic target 30 falls within a range whose distance to the vision angle center of the aerial vehicle 10 is less than a preset threshold.

In an embodiment of the present invention, the vision angle center of the aerial vehicle 10 overlaps with the center of the dynamic target 30. In an embodiment of the present invention, the processor 16 adjusts at least one of the following parameters to control the vision angle center of the aerial vehicle 10 to be overlapped with the center of the dynamic target 30:

the flight speed and the flight height of the aerial vehicle 10 and an angle of an on-board camera.

Figure 6:
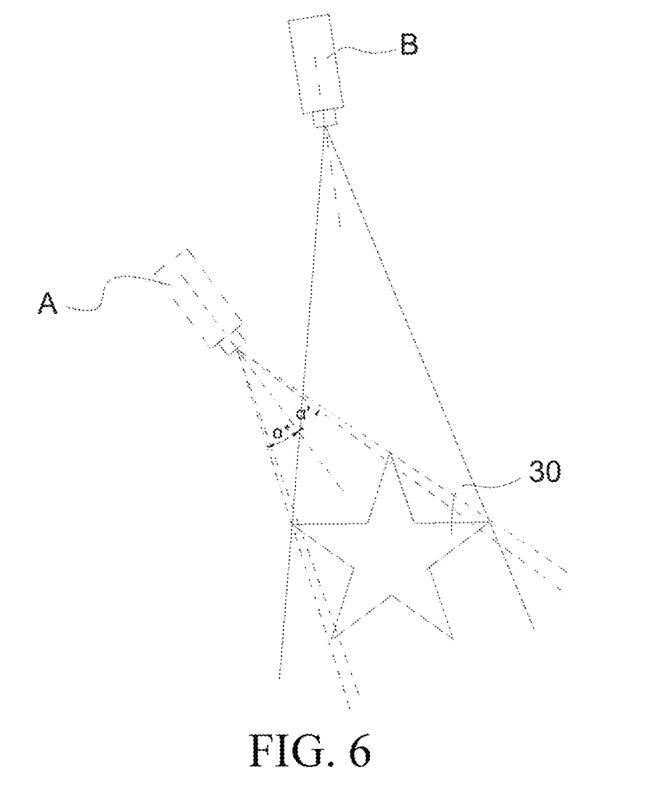
FIG. 6 is a schematic diagram in which the aerial vehicle shown in FIG. 1 increases a flight height of the aerial vehicle to ensure that the half angle of a vision angle for capturing a dynamic target does not exceed the half angle of a secure vision angle.

When the aerial vehicle 10 tracks the dynamic target 30, the processor 16 further needs to continuously determine whether a ratio of a vision angle $\alpha$ for capturing the dynamic target 30 to a maximum vision angle $\alpha^*$ of the on-board camera of the aerial vehicle 10 exceeds a secure vision angle ratio $\varepsilon$, where $\varepsilon<1$; and if a result is yes, the processor 16 adjusts the height of the aerial vehicle. This specification provides the concept of the secure vision angle ratio to ensure robustness of tracking the dynamic target 30 by the aerial vehicle 10, and avoid feature loss of the dynamic target 30 that is caused when the size of the dynamic target 30 in a shot image exceeds the vision angle of the camera.

When the aerial vehicle 10 tracks the dynamic target 30, the processor 16 controls the aerial vehicle 10 to maintain the vision angle center of the aerial vehicle 10 to be always overlapped with the center of the dynamic target 30. When the half angle $\alpha$ of the vision angle for capturing the image of the dynamic target 30 to the half angle $\alpha^*$ of the maximum vision angle of the camera exceeds the secure vision angle ratio $\varepsilon$, that is, $\alpha/\alpha^*>\varepsilon(\varepsilon<1)$, the processor 16 controls the aerial vehicle 10 to increase the height of the aerial vehicle 10 without changing a horizontal motion status, to ensure that the frame of the dynamic target 30 always falls within the secure vision angle of the camera. It is assumed that a maximum capturing vision angle of the on-board camera is 130°, and the secure vision angle ratio is set to 0.8. In this case, when the half angle of a target capturing vision angle is greater than $65°\times0.8=52°$, the height of the aerial vehicle needs to be increased.

As shown in FIG. 6, $\alpha^*$ is the half angle of the maximum vision angle of the camera, and $\alpha'$ is the half angle of the secure vision angle. In this case, $\alpha^*$ is also equal to the half angle $\alpha$ of the vision angle for capturing the image of the dynamic target 30. Therefore, $\alpha/\alpha^*=1$, and is greater than the secure vision angle ratio. Therefore, the processor 16 needs to control the aerial vehicle 10 to increase the flight height of the aerial vehicle 10, that is, adjusts the flight height from a location A to a location B in the figure.

If the processor 16 determines that the ratio of the vision angle for capturing the dynamic target 30 to the maximum vision angle of the on-board camera of the aerial vehicle 10 does not exceed the secure vision angle ratio, the processor 16 needs to further determine a type of the dynamic target 30 to determine whether the dynamic target 30 is a type of dynamic target that is unsuitable for landing by the aerial vehicle 10. The dynamic target 30 that is unsuitable for landing by the aerial vehicle 10 is usually a target, where once the aerial vehicle lands on the target, the dynamic target 30 is seriously damaged or the aerial vehicle 10 is seriously damaged. The target includes a person or an animal. The processor 16 may first identify the determined dynamic target 30, and classify the dynamic target 30. Once the dynamic target 30 is classified into a type of dynamic target that is unsuitable for landing by the aerial vehicle, the processor 16 controls the aerial vehicle 10 to land in a location near the dynamic target 30, or sends an instruction for reselecting a target to the controller 20 by using the transceiver 17, to prompt the user to reselect a dynamic target that needs to be tracked and landed on.

If the dynamic target 30 is not a type of dynamic target that is unsuitable for landing by the aerial vehicle, when the aerial vehicle 10 approaches the dynamic target 30, the aerial vehicle 10 is controlled to land on the dynamic target 30.

In an embodiment of the present invention, that the aerial vehicle 10 approaches the dynamic target 30 includes that the aerial vehicle 10 is located in a location right above the dynamic target 30 or that a distance between the aerial vehicle 10 and the dynamic target 30 is less than a preset threshold.

In an embodiment of the present invention, when the dynamic target 30 is not a type of dynamic target that is unsuitable for landing by the aerial vehicle 10, the processor 16 may control the aerial vehicle 10 to fly to a location above the dynamic target 30 and land on the dynamic target 30. Specifically, the processor 16 controls the flight height of the aerial vehicle 10 to maintain unchanged until the aerial vehicle 10 flies to a location right above the dynamic target 30, adjusts the flight speed of the aerial vehicle 10, and when the speed of the aerial vehicle 10 relative to the dynamic target 30 is less than a preset threshold, for example, the aerial vehicle 10 is still relative to the dynamic target 30, controls the aerial vehicle 10 to land on the dynamic target 30.

In an embodiment of the present invention, when the dynamic target 30 is a target that is unsuitable for landing by the aerial vehicle 10, the processor 16 controls the aerial vehicle 10 to land in a location near the dynamic target 30. In this case, the processor 16 may control the aerial vehicle 10 to land on ground, water, or another suitable location near the dynamic target 30.

Figure 7:
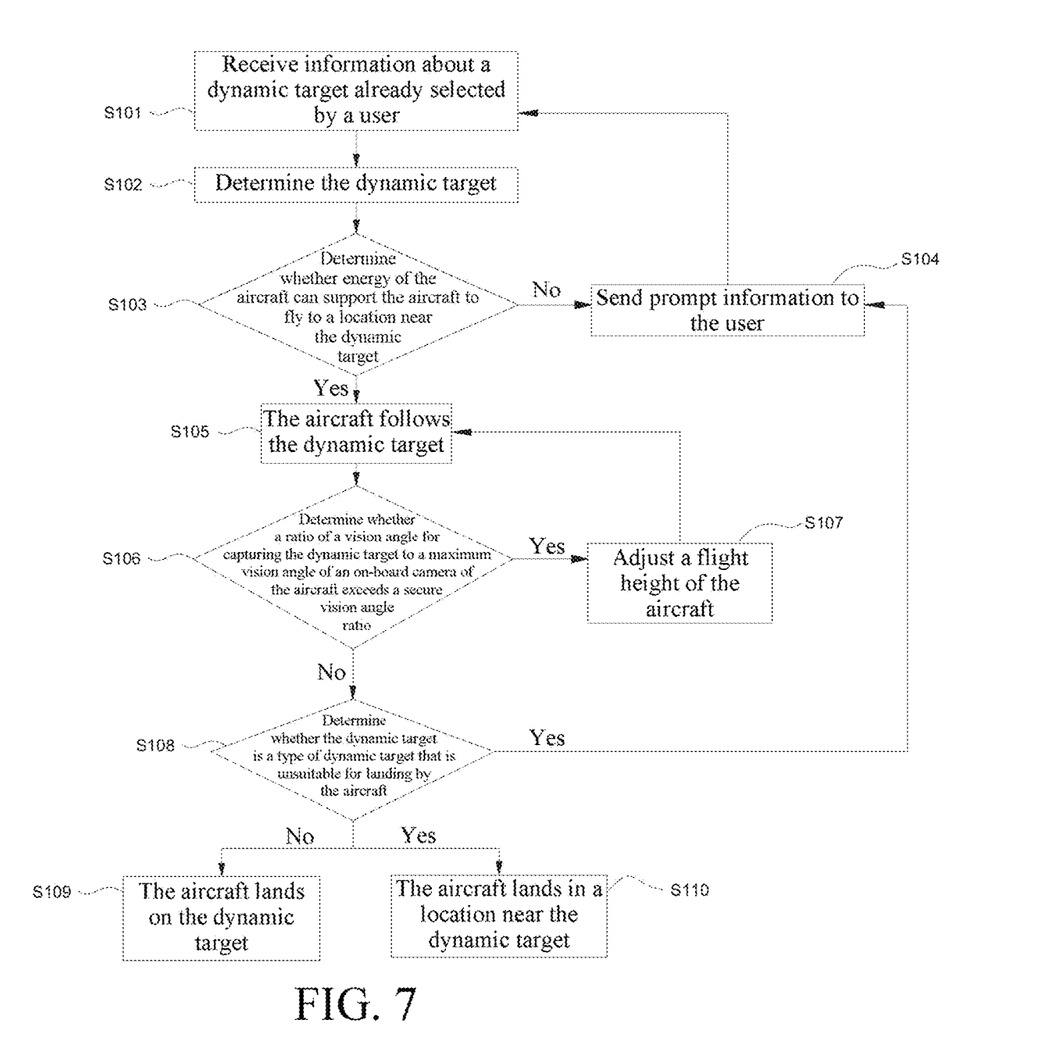
FIG. 7 is a flowchart of an aerial vehicle landing method according to another embodiment of the present invention.

FIG. 7 is a flowchart of an aerial vehicle landing method according to an embodiment of the present invention. The aerial vehicle landing method includes the following steps:

S101: An aerial vehicle receives information about a dynamic target already selected by a user.

In another possible embodiment, alternatively, the dynamic target may send a tracking and landing instruction to the aerial vehicle.

S102: The aerial vehicle determines the dynamic target.

S103: The aerial vehicle determines whether energy of the aerial vehicle can support the aerial vehicle to fly to a location near the dynamic target. The aerial vehicle may determine, according to the following several steps, whether energy of the aerial vehicle can support the aerial vehicle to fly to a location near the dynamic target:

predicting, according to a current movement status of the dynamic target, a distance that needs to be flown;

calculating, according to the calculated flight distance and energy that is consumed to fly a unit distance, energy that is needed for the aerial vehicle to reach a location near the dynamic target; and determining whether the needed energy is less than remaining energy of the aerial vehicle.

In view of this, the present invention provides an energy threshold factor λ used to represent a relationship between the needed energy and the remaining energy. The aerial vehicle determines whether λ is less than 1 to determine whether the aerial vehicle has sufficient energy to fly to a location near the dynamic target. In this embodiment, $$\lambda = \frac{E_{need}}{E_{left} \times \eta}.$$

$E_{left}$ is the remaining energy of the aerial vehicle, and $E_{need}$ is the needed energy of the aerial vehicle.

In this embodiment, $E_{need}=LE^*$, L is the flight distance predicted by the aerial vehicle according to the current movement status of the dynamic target 3, $$L \approx d_a + \left(v_a + \frac{v_a}{v_r} + \frac{v_a^2}{v_r^2}\right)\frac{d_a}{v_r},$$

$d_a$ indicates a current absolute distance between the aerial vehicle and the dynamic target, $v_a$ is a movement speed of the dynamic target, and $v_r$ is the maximum flight speed of the aerial vehicle.

$E^*$ is the energy that is consumed to fly the unit distance at the maximum flight speed by the aerial vehicle; and η indicates an energy output ratio, that is, a ratio of a maximum actual output energy to a battery capacity.

When λ>1, it indicates that the aerial vehicle has no sufficient energy to reach a location near the dynamic target. In this case, the aerial vehicle performs step S104, that is, the aerial vehicle sends prompt information to the user. The prompt information is used to prompt the user to reselect a dynamic target, or prompt the user that the energy of the aerial vehicle is insufficient, or prompt the user to reselect a dynamic target while prompting the user that the energy of the aerial vehicle is insufficient.

When λ<1, it indicates that the aerial vehicle has sufficient energy to reach a location near the dynamic target. In this case, the aerial vehicle performs step S105, that is, the aerial vehicle tracks the dynamic target.

In addition, when the aerial vehicle determines that 0.8<λ<1, it indicates that energy that the aerial vehicle needs to consume to fly to a location near the dynamic target is close to or reaches a critical value of the remaining energy. In this case, the aerial vehicle still follows the dynamic target 30, but still sends a prompt or an alert indicating that the aerial vehicle has insufficient energy to the user.

S106: When the aerial vehicle tracks the dynamic target, the aerial vehicle continuously determines whether a ratio of a vision angle for capturing the dynamic target to a maximum vision angle of an on-board camera of the aerial vehicle exceeds a secure vision angle ratio.

If a determining result is yes, perform step S107, that is, the aerial vehicle adjusts the flight height of the aerial vehicle, and perform step S105 and S106 again.

If a determining result is no, perform step S108.

S108: The aerial vehicle determines whether the dynamic target is a dynamic target that is unsuitable for landing.

If a determining result is no, perform step S109, that is, the aerial vehicle lands on the dynamic target.

If a determining result is yes, perform step S110 or step S104.

S110: The aerial vehicle lands in a location near the dynamic target.

For details of the steps in this method, refer to the foregoing descriptions. Details are not described herein again.

Figure 8:
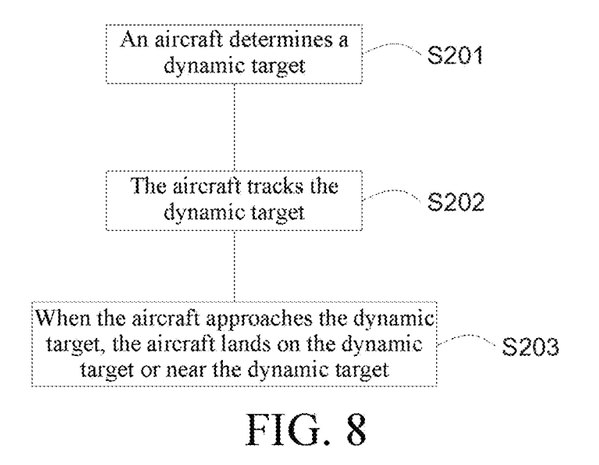
FIG. 8 is a flowchart of an aerial vehicle landing method according to another embodiment of the present invention.

As shown in FIG. 8, an embodiment of the present invention provides an aerial vehicle landing method. The method is executed by an aerial vehicle, and the method includes:

S201: An aerial vehicle determines a dynamic target, where the dynamic target is a moving target.

The aerial vehicle may determine the dynamic target by using information that is about the dynamic target already selected by a user and that is sent by a remote controller, or by using a tracking and landing instruction sent by the dynamic target to the aerial vehicle.

S202: The aerial vehicle tracks the dynamic target.

S203: When the aerial vehicle approaches the dynamic target, the aerial vehicle lands on the dynamic target or near the dynamic target. When the dynamic target is suitable for landing, the aerial vehicle lands on the dynamic target. When the dynamic target is unsuitable for landing (for example, a person or an animal), the aerial vehicle lands on ground or water near the dynamic target.

For details of the steps in this method, refer to the foregoing descriptions. Details are not described herein again.

Figure 9:
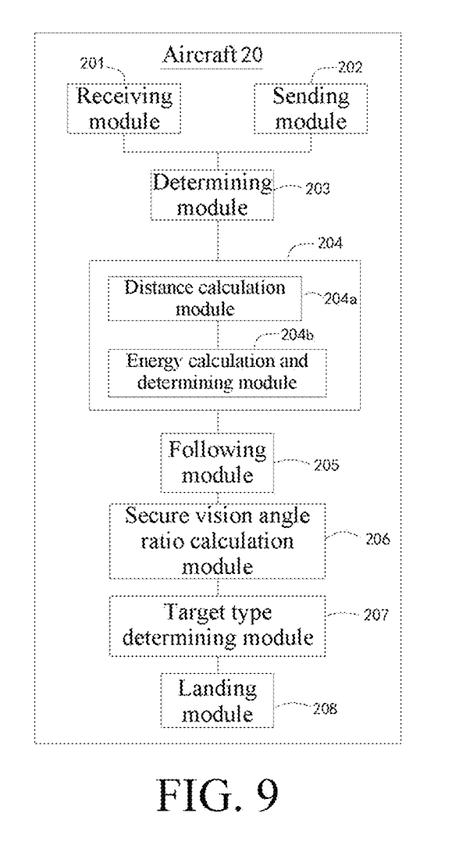
FIG. 9 is a structural block diagram of an aerial vehicle according to another embodiment of the present invention.

FIG. 9 is a structural block diagram of an aerial vehicle 20 according to a third embodiment of the present invention.

The aerial vehicle 20 includes:

a determining module 203, configured to determine a dynamic target;

a following module 205, configured to follow the dynamic target; and a landing module 208, configured to: when the aerial vehicle approaches the dynamic target, control the aerial vehicle to land on the dynamic target or near the dynamic target.

Optionally, the following module is further configured to: control a flight height of the aerial vehicle to maintain unchanged until the aerial vehicle flies to a location right above the dynamic target; and adjust a flight speed of the aerial vehicle, so that the aerial vehicle keeps still relative to the dynamic target.

Optionally, the following module is specifically configured to control the aerial vehicle to maintain the dynamic target to be located in a central area of an image shot by the aerial vehicle.

Optionally, the following module is specifically configured to control the aerial vehicle to maintain the center of the dynamic target to fall within a range whose distance to the vision angle center of the aerial vehicle is less than a preset threshold.

Optionally, the following module is specifically configured to control the vision angle center of the aerial vehicle to be overlapped with the center of the dynamic target.

Optionally, the following module adjusts at least one of the following parameters to control the aerial vehicle to maintain the vision angle center of the aerial vehicle to be overlapped with the center of the dynamic target:

the flight speed and the flight height of the aerial vehicle and an angle of a camera.

Optionally, when the aerial vehicle flies to a location above the dynamic target, the landing module is specifically configured to control the aerial vehicle to land on the dynamic target.

Optionally, the landing module is specifically configured to: when a speed of the aerial vehicle relative to the dynamic target is less than a preset threshold, control the aerial vehicle to land on the dynamic target.

Optionally, the landing module is specifically configured to: when the aerial vehicle is still relative to the dynamic target, control the aerial vehicle to land on the dynamic target.

Optionally, that the aerial vehicle approaches the dynamic target refers to that the aerial vehicle is located in a location right above the dynamic target.

Optionally, that the aerial vehicle approaches the dynamic target refers to that a distance between the aerial vehicle and the dynamic target is less than a preset threshold.

Optionally, the aerial vehicle 20 may further include:

a receiving module 201, configured to receive information sent by the controller or the dynamic target, where the information is used to indicate the dynamic target selected by a user; or configured to receive a landing instruction sent by the dynamic target, where the landing instruction is used to instruct the aerial vehicle to land on the dynamic target or near the dynamic target;

a sending module 202, configured to send an instruction for reselecting a target to the controller; and an energy estimation module 204, configured to determine whether energy of the aerial vehicle can support the aerial vehicle to reach a location near the dynamic target; and if a determining result of the energy estimation module is no, the sending module of the aerial vehicle sends prompt information to the controller, where the prompt information is used to prompt the user to reselect a dynamic target, and/or prompt the user that the energy of the aerial vehicle is insufficient.

Optionally, the energy estimation module 204 includes:

a distance calculation module 204a, configured to predict, according to a current movement status of the dynamic target, a flight distance that needs to be flown; and an energy calculation and determining module 204b, configured to calculate energy that is consumed to fly a unit distance at a maximum flight speed of the aerial vehicle by the aerial vehicle;

calculate, according to the predicted flight distance and energy that is consumed to fly a unit distance, energy that is needed for the aerial vehicle to reach a location near the dynamic target; and determine whether the needed energy is less than remaining energy of the aerial vehicle; and if not, send prompt information to the controller by using the transceiver of the aerial vehicle.

The following module 205 is configured to follow the dynamic target.

Optionally, the energy calculation and determining module is configured to: determine whether $$\lambda = \frac{E_{need}}{E_{left} \times \eta}$$

is less than 1; and if not, send the prompt information to the controller by using the sending module.

$E_{left}$ is the remaining energy of the aerial vehicle, and $E_{need}$ is the needed energy of the aerial vehicle.

$E_{need}=LE^*$, L is the flight distance predicted by the aerial vehicle according to the current movement status of the dynamic target, $$L \approx d_a + \left(v_a + \frac{v_a}{v_r} + \frac{v_a^2}{v_r^2}\right)\frac{d_a}{v_r},$$

$d_a$ indicates a current absolute distance between the aerial vehicle and the dynamic target, $v_a$ is a movement speed of the dynamic target, and $v_r$ is the maximum flight speed of the aerial vehicle.

$E^*$ is the energy that is consumed to fly the unit distance at the maximum flight speed by the aerial vehicle.

$\eta$ indicates an energy output ratio, that is, a ratio of a maximum actual output energy to a battery capacity.

Optionally, when the energy calculation and determining module determines that $0.8<\lambda<1$, the sending module sends information prompting the user that the energy of the aerial vehicle is insufficient to the controller.

A secure vision angle ratio calculation module 206 is configured to: calculate a ratio of a vision angle $\alpha$ for capturing the dynamic target to a maximum vision angle $\alpha^*$ of the camera; and when the ratio exceeds a secure vision angle ratio $\varepsilon$, adjust the flight height of the aerial vehicle, where $\varepsilon<1$.

A target type determining module 207 is configured to determine a type of the dynamic target; and when the target type determining module determines that the dynamic target is a type of dynamic target that is unsuitable for landing by the aerial vehicle, the landing module controls the aerial vehicle to land in a location whose distance from the dynamic target is less than a preset distance. Optionally, the target that is unsuitable for landing includes a person or an animal.

In an embodiment of the present invention, the determining module 203, the landing module 208, the target type determining module 207, the following module 205, the secure vision angle ratio calculation module 206, and the energy estimation module 204 may be processors (processor) or field programmable gate arrays (FPGA) of the aerial vehicle. Optionally, the determining module 203, the target type determining module 207, the following module 205, and the secure vision angle ratio calculation module 206 are all vision chips of the aerial vehicle. The receiving module 201 and the sending module 202 may be WiFi modules, Bluetooth modules, LTE modules, or the like of the aerial vehicle, and the energy estimation module 204 may be a battery chip of the aerial vehicle.

The present invention further provides an aerial vehicle, including a memory and a processor, where the memory stores a computer program, and when the computer program is executed by the processor, the processor is enabled to execute the method described in the embodiment shown in FIG. 7 or FIG. 8.

The present invention further provides a computer readable storage medium, storing a computer program, where when the computer program is executed by a processor, the processor is enabled to execute the method described in the embodiment shown in FIG. 7 or FIG. 8.

Persons of ordinary skill in the art can understand that all or some of the procedures in the methods of the embodiments can be finished by a computer program instructing related hardware, where the program can be stored in a nonvolatile computer readable storage medium. When the program is executed, procedures of the embodiments of all the methods can be included. The storage medium may be a magnetic disk, an optical disc, a read-only memory (Read-Only Memory, ROM), or the like.

The technical features of the embodiments may be randomly combined. For the purpose of concise description, not all possible combinations of the technical features of the embodiments are described. However, these technical features shall be considered as falling within the scope described in this specification as long as combinations of the technical features have no conflict.

The embodiments describe only several implementations of the present invention, which are described specifically in detail. However, it shall not be understood as a limitation on the patent scope of the present invention. It should be noted that persons of ordinary skill in the art may further make variations and improvements without departing from the design of the present invention, and these variations and improvements all fall within the protection scope of the present invention. Therefore, the patent protection scope of the present invention shall be subjected to the appended claims.

The invention claimed is:

1. An aerial vehicle landing method, comprising:
   determining, by an aerial vehicle, a dynamic target, wherein the dynamic target is a target in motion;
   following, by the aerial vehicle, the dynamic target; and
   landing, by the aerial vehicle, on the dynamic target or near the dynamic target, when the aerial vehicle approaches the dynamic target;
   wherein before the determining, by an aerial vehicle, a dynamic target, the method further comprises:
   receiving, by the aerial vehicle, information sent by a controller, wherein the information is used for indicating the dynamic target selected by a user; and
   wherein before the receiving, by the aerial vehicle, information sent by a controller, the method further comprises:
   sending, by the aerial vehicle, an instruction for reselecting a target to the controller.

2. The method according to claim 1, wherein before the determining, by an aerial vehicle, a dynamic target, the method further comprises:
   receiving, by the aerial vehicle, a landing instruction sent by the dynamic target, wherein the landing instruction is used to instruct the aerial vehicle to land on the dynamic target or near the dynamic target.

3. The method according to claim 1, wherein the landing, by the aerial vehicle, on the dynamic target or near the dynamic target, when the aerial vehicle approaches the dynamic target comprises:
   landing, by the aerial vehicle, on the dynamic target, when the aerial vehicle flies to a location above the dynamic target.

4. The method according to claim 3, wherein the landing, by the aerial vehicle, on the dynamic target comprises:
   landing, by the aerial vehicle, on the dynamic target, when a speed of the aerial vehicle relative to the dynamic target is less than a preset threshold.

5. The method according to claim 3, wherein the landing, by the aerial vehicle, on the dynamic target comprises:
   landing, by the aerial vehicle, on the dynamic target, when the aerial vehicle is relatively static to the dynamic target.

6. The method according to claim 3, wherein the method further comprises:
   maintaining, by the aerial vehicle, a flight height of the aerial vehicle unchanged until the aerial vehicle flies to a location right above the dynamic target; and
   adjusting, by the aerial vehicle, a flight speed of the aerial vehicle, so that the aerial vehicle keeps relatively static to the dynamic target.

7. The method according to claim 1, wherein that the aerial vehicle approaches the dynamic target refers to that the aerial vehicle is located in a location right above the dynamic target.

8. The method according to claim 1, wherein that the aerial vehicle approaches the dynamic target refers to that a distance between the aerial vehicle and the dynamic target is less than a preset threshold.

9. The method according to claim 1, wherein the landing, by the aerial vehicle, near the dynamic target comprises:
   landing, by the aerial vehicle, on the ground near the dynamic target.

10. The method according to claim 1, wherein the landing, by the aerial vehicle, near the dynamic target comprises:
    landing, by the aerial vehicle, on water near the dynamic target.

11. The method according to claim 1, wherein the landing, by the aerial vehicle, on the dynamic target or near the dynamic target comprises:
    determining a type of the dynamic target; and
    if the dynamic target is a type of dynamic target that is unsuitable for landing, landing in a location whose distance from the dynamic target is less than a preset distance.

12. The method according to claim 11, wherein the dynamic target that is unsuitable for landing comprises a person or other animals.

13. The method according to claim 1, wherein in the process of tracking the dynamic target by the aerial vehicle, the method further comprises:
    maintaining, by the aerial vehicle, the dynamic target to be located in a central area of an image shot by the aerial vehicle.

14. The method according to claim 1, wherein in the process of tracking the dynamic target by the aerial vehicle, the method further comprises:
    maintaining, by the aerial vehicle, the center of the dynamic target to fall within a range whose distance to the vision angle center of the aerial vehicle is less than a preset threshold.

15. The method according to claim 14, wherein the maintaining, by the aerial vehicle, the center of the dynamic target to fall within a range whose distance to the vision angle center of the aerial vehicle is less than a preset threshold comprises:
    maintaining, by the aerial vehicle, the vision angle center of the aerial vehicle to be overlapped with the center of the dynamic target.

16. The method according to claim 15, wherein the maintaining, by the aerial vehicle, the vision angle center of the aerial vehicle to be overlapped with the center of the dynamic target comprises:
    adjusting, by the aerial vehicle, at least one of the following parameters, to maintain the vision angle center of the aerial vehicle to be overlapped with the center of the dynamic target:
    the flight speed of the aerial vehicle, the flight height of the aerial vehicle and an angle of a camera.

17. The method according to claim 1, wherein the method further comprises:

determining, by the aerial vehicle, whether a ratio of a vision angle α for capturing the dynamic target to a maximum vision angle α* of the camera exceeds a secure vision angle ratio ε; and if a result is yes, adjusting, by the aerial vehicle, the flight height of the aerial vehicle, wherein ε<1.

18. The method according to claim 1, wherein after the determining, by an aerial vehicle, a dynamic target, the method further comprises:

determining whether energy of the aerial vehicle can support the aerial vehicle to reach a location near the dynamic target; and if a determining result is no, sending prompt information to the controller, wherein the prompt information is used to prompt the user to reselect a dynamic target.

19. An aerial vehicle landing method, comprising:

determining, by an aerial vehicle, a dynamic target, wherein the dynamic target is a target in motion;

following, by the aerial vehicle, the dynamic target; and landing, by the aerial vehicle, on the dynamic target or near the dynamic target, when the aerial vehicle approaches the dynamic target;

wherein after the determining, by an aerial vehicle, a dynamic target, the method further comprises:

determining whether energy of the aerial vehicle can support the aerial vehicle to reach a location near the dynamic target; and if a determining result is no, sending prompt information to the controller, wherein the prompt information is used to prompt the user to reselect a dynamic target, and/or prompt the user that the energy of the aerial vehicle is insufficient.

20. The method according to claim 19, wherein the determining whether energy of the aerial vehicle can support the aerial vehicle to reach a location near the dynamic target comprises:

predicting, by the aerial vehicle according to a current movement status of the dynamic target, a flight distance that needs to be flown;

determining, by the aerial vehicle, energy that is consumed to fly a unit distance at a maximum flight speed of the aerial vehicle;

calculating, by the aerial vehicle according to the predicted flight distance and the energy that is consumed to fly the unit distance, energy that is needed for the aerial vehicle to reach a location near the dynamic target; and determining whether the needed energy is less than remaining energy of the aerial vehicle; and if not, sending prompt information to the controller.

21. The method according to claim 20, wherein the determining whether the needed energy is less than remaining energy of the aerial vehicle comprises:

determining whether $$\lambda = \frac{E_{need}}{E_{left} \times \eta}$$

is less than 1; and if not, sending the prompt information to the controller, wherein $E_{left}$ is the remaining energy of the aerial vehicle, and
$E_{need}$ is the needed energy of the aerial vehicle,
$E_{need}$=LE*, L is the flight distance predicted by the aerial vehicle according to the current movement status of the dynamic target, $$L \approx d_a + \left(v_a + \frac{v_a}{v_r} + \frac{v_a^2}{v_r^2}\right)\frac{d_a}{v_r},$$

$d_a$ indicates a current absolute distance between the aerial vehicle and the dynamic target, $v_a$ is a movement speed of the dynamic target, and $v_r$ is the maximum flight speed of the aerial vehicle;

E* is the energy that is consumed to fly the unit distance at the maximum flight speed by the aerial vehicle; and η indicates an energy output ratio, that is, a ratio of a maximum actual output energy to a battery capacity.

22. The method according to claim 21, wherein the method further comprises:

sending, by the aerial vehicle, information prompting the user that the energy of the aerial vehicle is insufficient to the controller, in a process in which the aerial vehicle tracks the dynamic target, when 0.8<λ<1.

23. An aerial vehicle, comprising:

a housing;

an aerial vehicle arm connected to the housing; and a power apparatus disposed on the aerial vehicle arm and a processor disposed in the housing, wherein the processor is configured to:

determine a dynamic target, wherein the dynamic target is a target in motion;

control the unmanned aerial vehicle to follow the dynamic target; and control the aerial vehicle to land on the dynamic target or near the dynamic target, when the aerial vehicle approaches the dynamic target;

wherein the processor is further configured to:

determine whether energy of the aerial vehicle can support the aerial vehicle to reach a location near the dynamic target; and if a determining result is no, send prompt information to the controller, wherein the prompt information is used to prompt the user to reselect a dynamic target, and/or prompt the user that the energy of the aerial vehicle is insufficient;

wherein the processor is specifically configured to:

predict, according to a current movement status of the dynamic target, a flight distance that needs to be flown;

determine energy that is consumed to fly a unit distance at a maximum flight speed of the aerial vehicle;

calculate, according to the predicted flight distance and the energy that is consumed to fly the unit distance, energy that is needed for the aerial vehicle to reach a location near the dynamic target; and determine whether the needed energy is less than remaining energy of the aerial vehicle; and if not, send prompt information to the controller by using the transceiver of the aerial vehicle; and wherein the processor is specifically configured to:

determine whether $$\lambda = \frac{E_{need}}{E_{left} \times \eta}$$

is less than 1; and if not, sending the prompt information to the controller by using the transceiver, wherein $E_{left}$ is the remaining energy of the aerial vehicle, and
$E_{need}$ is the needed energy of the aerial vehicle;

$E_{need}=LE^*$, L is the flight distance predicted by the aerial vehicle according to the current movement status of the dynamic target, $$L \approx d_a + \left(v_a + \frac{v_a}{v_r} + \frac{v_a^2}{v_r^2}\right)\frac{d_a}{v_r},$$

$d_a$ indicates a current absolute distance between the aerial vehicle and the dynamic target, $v_a$ is a movement speed of the dynamic target, and $v_r$ is the maximum flight speed of the aerial vehicle;

$E^*$ is the energy that is consumed to fly the unit distance at the maximum flight speed by the aerial vehicle; and η indicates an energy output ratio, that is, a ratio of a maximum actual output energy to a battery capacity.

24. The aerial vehicle according to claim 23, wherein the aerial vehicle further comprises:
a transceiver, configured to receive information sent by a controller, wherein the information is used for indicating the dynamic target selected by a user.

25. The aerial vehicle according to claim 24, wherein the transceiver is further configured to send an instruction for reselecting a target to the controller.

26. The aerial vehicle according to claim 23, wherein the transceiver is further configured to receive a landing instruction sent by the dynamic target, wherein the landing instruction is used to instruct the aerial vehicle to land on the dynamic target or near the dynamic target.

27. The aerial vehicle according to claim 23, wherein the processor is specifically configured to control the aerial vehicle to land on the dynamic target, when the aerial vehicle flies to a location above the dynamic target.

28. The aerial vehicle according to claim 27, wherein the processor is configured to: control the aerial vehicle to land on the dynamic target, when a speed of the aerial vehicle relative to the dynamic target is less than a preset threshold.

29. The aerial vehicle according to claim 27, wherein the processor is specifically configured to: when the aerial vehicle is still relative to the dynamic target, control the aerial vehicle to land on the dynamic target.

30. The aerial vehicle according to claim 27, wherein the processor is further configured to: control a flight height of the aerial vehicle to maintain unchanged until the aerial vehicle flies to a location right above the dynamic target; and
adjust a flight speed of the aerial vehicle, so that the aerial vehicle keeps relatively static to the dynamic target.

31. The aerial vehicle according to claim 23, wherein that the aerial vehicle approaches the dynamic target refers to that the aerial vehicle is located in a location right above the dynamic target.

32. The aerial vehicle according to claim 23, wherein that the aerial vehicle approaches the dynamic target refers to that a distance between the aerial vehicle and the dynamic target is less than a preset threshold.

33. The aerial vehicle according to claim 23, wherein the processor is specifically configured to control the aerial vehicle to land on the ground near the dynamic target.

34. The aerial vehicle according to claim 23, wherein the processor is specifically configured to control the aerial vehicle to land on water near the dynamic target.

35. The aerial vehicle according to claim 23, wherein the processor is specifically configured to:
determine a type of the dynamic target; and
if the dynamic target is a type of dynamic target that is unsuitable for landing, control the aerial vehicle to land in a location whose distance from the dynamic target is less than a preset distance.

36. The aerial vehicle according to claim 35, wherein the dynamic target that is unsuitable for landing comprises a person or other animals.

37. The aerial vehicle according to claim 23, wherein
the transceiver sends information prompting the user that the energy of the aerial vehicle is insufficient to the controller, in a process in which the aerial vehicle tracks the dynamic target, when $0.8 < \lambda < 1$.

38. The aerial vehicle according to claim 23, wherein in the process of tracking the dynamic target by the aerial vehicle, the processor is further configured to control the aerial vehicle so that the dynamic target is located in a central area of an image shot by the aerial vehicle.

39. The aerial vehicle according to claim 23, wherein in the process of tracking the dynamic target by the aerial vehicle, the processor is further configured to control the aerial vehicle so that the center of the dynamic target falls within a range whose distance to the vision angle center of the aerial vehicle is less than a preset threshold.

40. The aerial vehicle according to claim 39, wherein the processor is specifically configured to control the vision angle center of the aerial vehicle to be overlapped with the center of the dynamic target.

41. The aerial vehicle according to claim 40, wherein the processor is specifically configured to adjust at least one of the following parameters to control the vision angle center of the aerial vehicle to be overlapped with the center of the dynamic target:
the flight speed and the flight height of the aerial vehicle and an angle of a camera.

42. The aerial vehicle according to claim 23, wherein the processor is further configured to:
determine whether a ratio of a vision angle α for capturing the dynamic target to a maximum vision angle α* of the camera exceeds a secure vision angle ratio ε; and
if a result is yes, adjust the flight height of the aerial vehicle, wherein $\varepsilon < 1$.

\* \* \* \* \*